(12) United States Patent
Yoppolo et al.

(10) Patent No.: US 7,579,105 B2
(45) Date of Patent: Aug. 25, 2009

(54) END CAP ASSEMBLY AND VENT FOR HIGH POWER CELLS

(75) Inventors: Robert A. Yoppolo, New Milford, CT (US); Richard E. Durkot, East Walpole, MA (US); Daniel Allen, New Milford, CT (US); James Cervera, Sandy Hook, CT (US); Oleg Podoprigora, New Milford, CT (US)

(73) Assignee: The Gillette Company, Boston, MA (US)

( * ) Notice: Subject to any disclaimer, the term of this patent is extended or adjusted under 35 U.S.C. 154(b) by 1046 days.

(21) Appl. No.: 11/062,232

(22) Filed: Feb. 18, 2005

(65) Prior Publication Data

US 2006/0188779 A1  Aug. 24, 2006

(51) Int. Cl.
   *H01M 2/12* (2006.01)
   *H01M 2/08* (2006.01)
(52) U.S. Cl. .................... 429/56; 429/61; 429/82; 429/174
(58) Field of Classification Search .................. 429/53, 429/54, 55, 56, 61, 174, 82
   See application file for complete search history.

(56) References Cited

U.S. PATENT DOCUMENTS

| 3,314,824 | A |   | 4/1967  | Spanur              |        |
|-----------|---|---|---------|---------------------|--------|
| 3,485,673 | A | * | 12/1969 | Jost .............   | 429/54 |
| 3,884,722 | A | * | 5/1975  | Tucholski .......    | 429/54 |
| 4,227,701 | A |   | 10/1980 | Tsuchida            |        |
| 4,537,841 | A |   | 8/1985  | Wiacek              |        |
| 4,774,155 | A | * | 9/1988  | Nientiedt et al. ... | 429/56 |
| 4,780,378 | A | * | 10/1988 | McCartney et al. ... | 429/54 |
| 5,080,985 | A |   | 1/1992  | Wiacek              |        |
| 5,589,293 | A |   | 12/1996 | Pope                |        |
| 5,879,832 | A |   | 3/1999  | Vu                  |        |
| 6,083,639 | A |   | 7/2000  | McHugh              |        |
| 6,127,062 | A |   | 10/2000 | Sargeant            |        |
| 6,270,918 | B1 | * | 8/2001  | Wu .............    | 429/56 |
| 6,492,062 | B1 |   | 12/2002 | Wang                |        |
| 6,686,091 | B2 |   | 2/2004  | Yamamoto            |        |
| 2004/0043292 | A1 |   | 3/2004  | Christian          |        |
| 2007/0154783 | A1 | * | 7/2007  | Jeon ............. | 429/53 X |

* cited by examiner

*Primary Examiner*—Stephen J. Kalafut
(74) *Attorney, Agent, or Firm*—Barry D. Josephs (57) ABSTRACT

And end cap assembly and venting system therein for closing and sealing the open end of a cell housing. The end cap assembly comprises a sealing disk underlying an end cap, and a metal support disk between the end cap and the sealing disk. The metal support disk has a plurality of primary vent apertures and a plurality of secondary vent apertures through its surface. The primary vent apertures are spaced apart along a path located at a greater distance from the central longitudinal axis of the metal support disk than the secondary vent apertures. The insulating sealing disk may have a thinned portion therein forming an rupturable membrane circumventing the central hub of the sealing disk. The insulating sealing disk may have protrusions emanating from its top surface to deflect the membrane during rupture. The venting system releases internal gases rapidly from the cell in the event of an abusive or short circuit discharge.

67 Claims, 6 Drawing Sheets

END CAP ASSEMBLY AND VENT FOR HIGH POWER CELLS

FIELD OF THE INVENTION

The invention relates to an end cap assembly and venting system for sealing electrochemical cells, particularly high power primary cells. The invention relates to alkaline cells and more particularly high power alkaline cells.

BACKGROUND

Conventional electrochemical cells, such as alkaline cells, are formed of a cylindrical housing having an open end and an end cap assembly inserted therein to seal the housing. Conventional alkaline cells typically comprise an anode comprising zinc, a cathode comprising manganese dioxide, and an alkaline electrolyte comprising aqueous potassium hydroxide. The alkaline cell may for example also comprise an anode comprising zinc, a cathode comprising nickel oxyhydroxide and an alkaline electrolyte comprising aqueous potassium hydroxide. Such nickel oxyhydroxide alkaline cell, for example, is shown in published application US2004/0043292 A1 and U.S. Pat. No. 6,686,091 B2. After the cell contents are supplied, the cell is closed by crimping the housing edge over the end cap assembly to provide a tight seal for the cell. The end cap assembly comprises an exposed end cap plate which functions as a cell terminal and typically includes a plastic insulating plug, which seals the open end of the cell housing.

A problem associated with design of various electrochemical cells, particularly alkaline cells, is the tendency of the cell to produce gases when it is subjected to abusive discharge conditions or as it continues to discharge beyond a certain point, normally near the point of complete exhaustion of the cell's useful capacity. Electrochemical cells, particularly alkaline cells, are conventionally provided with rupturable diaphragms or rupturable membranes within an end cap assembly. The rupturable diaphragm or membrane may be formed within a plastic insulating member as described, for example, in U.S. Pat. No. 3,617,386. Such diaphragms are designed to rupture when gas pressure within the cell exceeds a predetermined level. The end cap may be provided with several vent holes for the gas to escape when the diaphragm or membrane is ruptured. The end cap assembly disclosed in U.S. Pat. No. 3,617,386 discloses a grooved rupturable seal diaphragm and a separate metal contact disk between the end cap and seal diaphragm. The end cap assembly disclosed in the reference is not designed to withstand radial compressive forces and will tend to leak when the cell is subjected to extremes in hot and cold climate.

In order to provide a tight seal contemporary prior art typically disclose end cap assemblies which include a metal support disk inserted between the end cap plate and an insulating member. The separate metal support disk is radially compressed when the cell housing edge is crimped over the end cap assembly. The insulating plug is typically in the form of a plastic insulating disk which extends from the center of the cell towards the cell housing and electrically insulates the metal support disk from the cell housing. The metal support disk may have a highly convoluted surface as shown in U.S. Pat. Nos. 5,759,713 or 5,080,985 which assures that end cap assembly can withstand high radial compressive forces during crimping of the cell's housing edge around the end cap assembly. This results in a tight mechanical seal around the end cap assembly at all times.

The prior art discloses rupturable vent membranes which are integrally formed as thinned areas within the insulating disk included within the end cap assembly. Such vent membranes can be oriented such that they lie in a plane perpendicular to the cell's longitudinal axis, for example, as shown in U.S. Pat. No. 5,589,293, or they may be oriented so that they are slanted in relation to the cell's longitudinal axis as shown in U.S. Pat. No. 4,227,701. In the latter U.S. Pat. No. 4,227,701 the insulating sealing disk is slideably mounted on an elongated current collector running therethrough. As gas pressure within the cells builds up the center portion of the insulating sealing disk slides upwards towards the cell end cap, thereby stretching the membrane until it ruptures and gas is released through a vent hole in the terminal plate. U.S. Pat. No. 6,127,062 discloses an insulating sealing disk and an integrally formed rupturable membrane which is oriented vertically, that is, parallel to the cell's central longitudinal axis. When the gas pressure within the cell rises to a predetermined level the membrane ruptures thereby releasing the gas pressure to the external environment.

The rupturable membrane can be in the form of one or more islands of thin material within the insulating disk as shown in U.S. Pat. No. 5,589,293. Alternatively, the rupturable membrane can be in the form of a thin portion circumventing the cell' longitudinal axis as shown in U.S. Pat. No. 5,080,985. When the membrane ruptures gas is released through vent holes 49 oriented along the outer downwardly sloping arm of the metal support disk 40. The circumventing thinned portion forming the rupturable membrane can be in the form of thinned regions at the base of annular grooves within the insulating disk as shown in U.S. Pat. No. 4,237,203. The rupturable membrane may also be a separate piece of polymeric film which is sandwiched between the metal support disk and the insulating disk and facing apertures therein as shown in Patent Application Publication US 2002/0127470 A1. A pointed or other protruding member can be oriented above the rupturable membrane to assist in rupture of the membrane as shown in U.S. Pat. No. 3,314,824. When gas pressure within the cell becomes excessive, the membrane expands and ruptures upon contact with the pointed member, thereby allowing gas from within the cell to escape to the environment through apertures in the overlying terminal end cap.

Improvements have been made to primary cells, particularly primary alkaline primary cells, which allow them to discharge at higher power for longer periods of time at such high power levels than previously possible before polarization occurs. (Polarization may limit ionic transport, cause buildup of charge at the electrodes, and ultimately limit the level of power output attainable.) The development of such high power primary alkaline cells makes them more suitable as a replacement for high power rechargeable cells, for example as replacement for nickel metal hydride or lithium ion rechargeable cells, which are commonly used in digital cameras or cell phones. Because of the high power characteristics of the improved alkaline cells, they are typically subjected to rigorous testing to assure their safety. One such method of testing is to subject the cell to short circuiting to determine if safety systems within the cell operate properly to shut down the cell in time to avoid any catastrophic result.

In high power cells rapid temperature rise and excessive gassing within the cell may occur in tandem when the cell is improperly used, for example, if the cell is subjected to short circuit conditions. The gassing may increase as secondary reactions occur at an increasingly faster rate as the cell temperature rises. The gas pressure within the cell will also rise as a direct function of the rise in cell temperature. The rate of gassing and accompanying internal gas pressure build up can thus be expected to increase as the high power primary cell is subjected to such short circuit conditions.

The prior art teaches the installation and use of PTC (positive thermal coefficient) device which is normally connected in series with a cell electrode. The PTC device, which may be a thin slab of material, has the property that its resistance increases dramatically as the cell temperature increases, for example, in a short circuit situation. (The increase in resistance is due to an increase in resistivity and expansion in length as the PTC device is exposed to elevated temperatures.) As the PTC resistance increases the current drain and power output of the cell shuts down. Other thermally responsive devices such as bimetallic disks and shape memory deflect on exposure to elevated temperatures. These devices have been used in high power cells to break the conductive pathway between electrode material and corresponding terminal as the cell overheats, thus causing the cell to immediately shut down. End cap assemblies for high power cells which incorporate such thermally responsive devices are shown in U.S. Pat. Nos. 5,879,832 and 6,083,639. These devices although very effective take up room within the end cap assembly and add to cell cost.

Accordingly, it is desirable to have an end cap assembly with improved venting system therein for high power primary cells, particularly high power alkaline cells, which protects the cell in the event the cell is subjected to short circuit conditions.

It is desirable that the high power primary cell have a safety mechanism built into the cell which allows the cell's internal temperature to dissipate rapidly in the event that the cell is subjected to abusive operation such as short circuit discharge conditions.

It is desirable that the cell have an improved venting system which allows gas within the cell to be rapidly released from the cell if gas pressure within the cell builds up rapidly due to abusive cell operation.

SUMMARY OF THE INVENTION

In a principal aspect the invention is directed to an electrochemical cell with an end cap assembly having an improved venting system therein. The venting system is activated when gas pressure within the cell buildups to a level beyond a predetermined design limit. The venting system once activated allows gas from within the cell to pass rapidly therefrom to the environment to safeguard the cell from a catastrophic rupture. The cell housing is characterized by having an integral body surface with closed end and opposing open end. The housing body is preferably cylindrical and thus in a preferred embodiment the cell is a cylindrical cell. However, the housing may also have at least one substantially flat side running along its length or a pair of opposing substantially flat sides running along its length. The cell is preferably a primary (nonrechargeable) cell. The cell is preferably a primary alkaline cell in that the electrolyte is typically an alkaline electrolyte. After the anode and cathode materials with separator therebetween is inserted into the cell housing, the end cap assembly is positioned into the housing open end and crimped or else otherwise secured along an edge thereof to seal the cell.

In a principal aspect the end cap assembly of the invention with improved venting system has a principal utility and application in connection with sealing high power cells, in particular high power primary alkaline cells. The term "high power" as employed hereinafter shall mean a cell having the characteristic that when the anode and cathode are configured to an AA size cell, and the AA size cell is drained at a constant power output level of 1 Watt continuous, the cell can output at least 1.2 Watt-hrs of electrical energy. The test is conducted on fresh AA cells by gradually lowering the load resistance, that is, by gradually raising the current drain as the cell's voltage drops during discharge in order to maintain a continuous 1 Watt power output, until such level of power output can no longer be obtained. It is assumed that such test is performed on a "fresh" cell, that is, a cell that has not been previously subjected to consumer usage. The cells tested may typically have an open circuit voltage of between about 1 and 3 volt when fresh. In a preferred embodiment the cell may be a zinc/nickel oxyhydroxide alkaline cell, but may also be a zinc/$MnO_2$ cell. It is not intended that the end cap assembly with improved venting system of the invention be limited just these two types of anode/cathode chemistries, since the invention is equally applicable to other primary alkaline cells or other primary cells which generate gases upon discharge.

The improved venting system of the invention is capable of releasing gases from within the cell very rapidly when a predetermined level of gas pressure is reached within the cell. The venting system of the invention has particular utility in safeguarding the cell and preventing a catastrophic rupture of the cell housing or decrimping of the end cap assembly should gas within the cell buildup to a predetermined high level, even if the cell is subjected to abusive operating conditions including direct and prolonged short circuiting.

The end cap assembly with improved venting system of the invention has particular utility in safeguarding high power primary cells such as zinc/nickel oxyhydroxide alkaline cell. Such cell is very active. When it is subjected to an abusive short circuiting test, the cell internal temperature can become very hot within just 2 to 3 minutes. Under these conditions if the short circuit discharge is left uninterrupted the $I^2R$ heating within the cell interior can cause the cell housing outside skin temperature to reach levels over 200° C. and even over 250° C. within a span of just 2 to 3 minutes. As the cell's internal temperature increases the rate of secondary electrochemical reactions increase. These reactions are exothermic and generate additional heat and more gassing. The increase in cell temperature further elevates the gas pressure. The venting system of the invention is automatically activated and gas rapidly released from the cell to avoid any possibility of a cell rupture. The rapid release of gases also quickly reduces the cell's internal temperature thereby further safeguarding the cell.

The end cap assembly of the invention comprises an end cap and insulating sealing disk with a metal support disk therebetween. The improved venting system of the invention has a group of primary vent apertures as well as a group of secondary vent apertures in the surface of the metal support disk. The secondary vent apertures are characterized in that they are positioned through a surface of the metal support disk so that they are located at a smaller distance from the center of said metal support disk than the primary vent apertures. Desirably the centers of the primary vent apertures are at an average distance $R_1$ from the central longitudinal axis of the metal support disk and the secondary vent apertures are at an average distance $R_2$ from the central longitudinal axis of the metal support disk, wherein $R_2<R_1$. Preferably the centers of the primary vent apertures lie substantially in a plane along a circumferential path at an average radius, $R_1$, from the central longitudinal axis of the metal support disk and the centers of the secondary vent apertures lie substantially in a plane along a circumferential path at an average radius, $R_2$, from the central longitudinal axis of the metal support disk, wherein $R_2<R_1$. In an AA size cell there may typically be between about 2 and 4 primary apertures spaced apart through the surface of metal support disk and between about 2 and 4 secondary apertures. The primary and secondary apertures may be circular, or polygonal in shape or may have one or more surfaces which are curvilinear and one or more surfaces which are straight. In an AA size cell The primary apertures based on a rectangular shape may typically have a height of about 1.5 mm in the cell's longitudinal direction and a length of about 2.0 mm in the cell's circumferential direction. The secondary apertures may typically have a diameter of between about 0.5 and 1.5 mm based on a circular shape. The primary apertures thus may typically have a total cross area of between about 6 and 12 mm$^2$ and secondary apertures may typically have combined total cross area of between about 0.40 and 7.1 mm$^2$. (The cross area is defined as the area determined by a plane perpendicular to the aperture's longitudinal axis.)

In a principal aspect the insulating sealing disk has a central boss and integrally formed radial circumferential arm extending therefrom and surrounding said boss. Preferably a portion of the radially extending arm has an annular thinned portion therein which abuts and circumvents the boss. The annular thinned portion forms a rupturable membrane which has a thickness such that the membrane ruptures when gases within the cell reach a predetermined pressure level. Additionally there is a plurality of integrally formed raised protrusions (standoffs), preferably wedge shaped protrusions having a slanted top surface, emanating from the top surface of the insulating sealing disk. (The protrusions are oriented so that high end of the slanted top surface faces and nearly abuts the rupturable membrane.) These protrusions are oriented and positioned preferably in a circumferential path around the center of the insulating sealing disk so that they deflect any pieces of rupturing membrane from penetrating and clogging the primary vent apertures during rupture of said membrane.

The end cap assembly of the invention desirably is also is fitted with a paper or plastic insulating washer which rests on the top peripheral edge of the cell housing. An end cap having a plurality of apertures therethrough is positioned over the washer. There is an elongated current collector which penetrates through the central boss of the insulating sealing disk and into the anode material. Preferably the end cap is welded to the top surface of the metal support disk. In a zinc/MnO$_2$ alkaline cell or a zinc/nickel oxyhydroxide alkaline cell the zinc anode material is centrally located within the core of the cell housing and the MnO$_2$ or nickel oxyhydroxide cathode material is annularly located so that it abuts the housing inside surface. Thus, in an alkaline cell the negative current path is from the anode to elongated current collector to metal support disk to end cap and the positive conductive path is from cathode to housing to housing closed end.

In an aspect of the invention by adjusting the membrane thickness within the insulating sealing disk, the membrane can be designed to rupture when gas within the cell builds up to level less than 1000 psig (689.4×10$^4$ pascal gage). In an AA size cylindrical cell the membrane rupture pressure is desirably between about 300 and 950 psig (206.8×10$^4$ and 654.9×10$^4$ pascal gage), preferably a pressure of between about 300 and 750 psig (206.8×10$^4$ and 517.1×10$^4$ pascal gage). In an C size cylindrical cell the membrane rupture pressure is desirably between about 100 and 400 psig (689.4×10$^3$ and 275.8×10$^4$ pascal gage). In a D size cylindrical cell the membrane rupture pressure is desirably between about 50 and 250 psig (344.7×10$^3$ and 172.4×10$^4$ pascal gage). In an AAA size cylindrical cell the membrane rupture pressure is between about 450 and 1150 psig (310.2×10$^4$ and 792.8×10$^4$ pascal gage). The membrane, preferably of nylon, may be designed to rupture to accomplish the above rupture pressures when it is designed to have a thickness between about 3 and 12 mil (0.0762 and 0.305 mm), desirably between about 3 and 8 mil (0.0762 and 0.203 mm), typically between about 6 and 10 mil (0.152 and 0.254 mm).

The end cap assembly with the improved venting system of the invention allows the rapid venting of gases from the interior of the cell even if the cell is subjected to direct and prolonged short circuit conditions which can quickly raise the cell's internal gas pressure and temperature. The venting system of the invention is designed to activate promptly and rapidly vent the internal gases to prevent any catastrophic cell rupture from occurring. In particular with a zinc/nickel oxyhydroxide alkaline cell, venting gases from the cell with the end cap assembly of the invention before the internal gas pressure reaches a level of about 1000 psig (689.4×10$^4$ pascal gage) assures that the housing outside surface temperature remains at a temperature below 160° C. when the cell is subjected to short circuit conditions.

DETAILED DESCRIPTION

Figure 1:
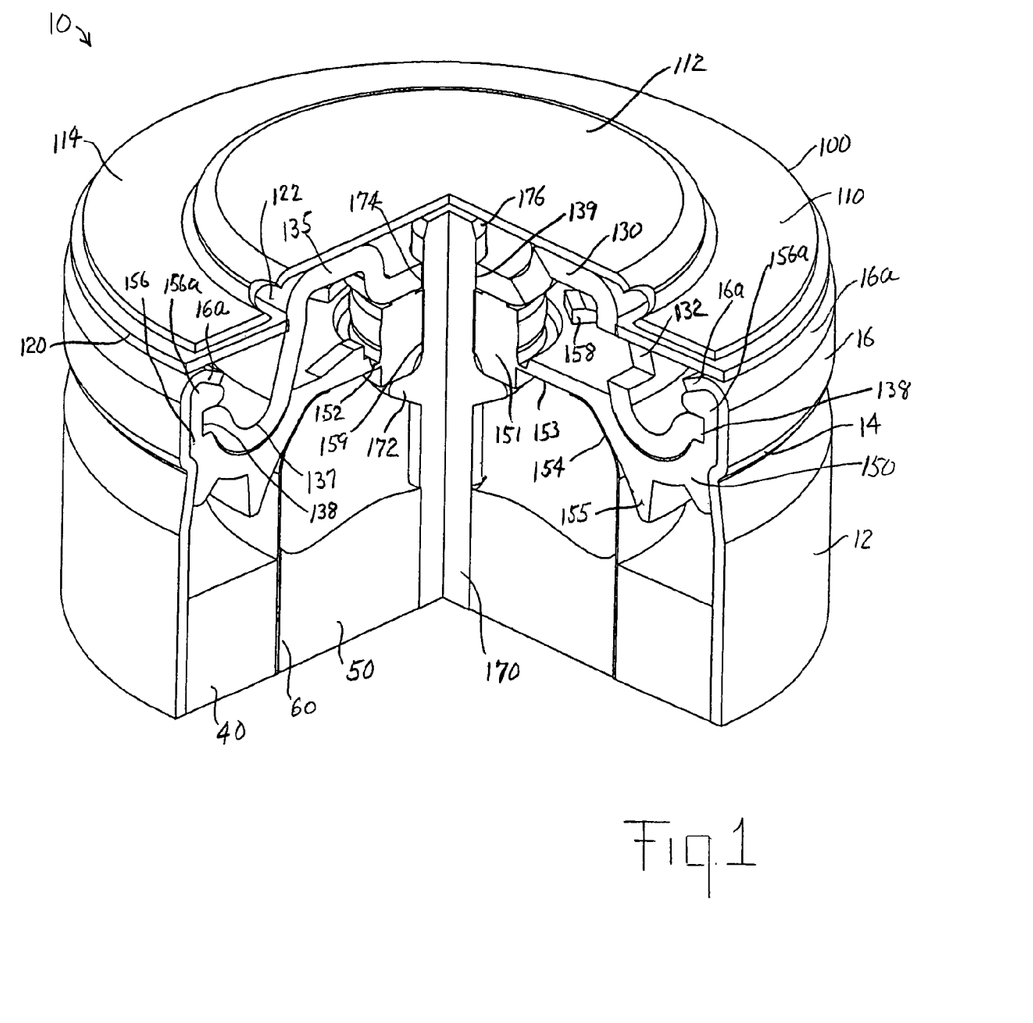
FIG. 1 is a cut-away pictorial view of the end cap assembly of the invention.
Figure 2:
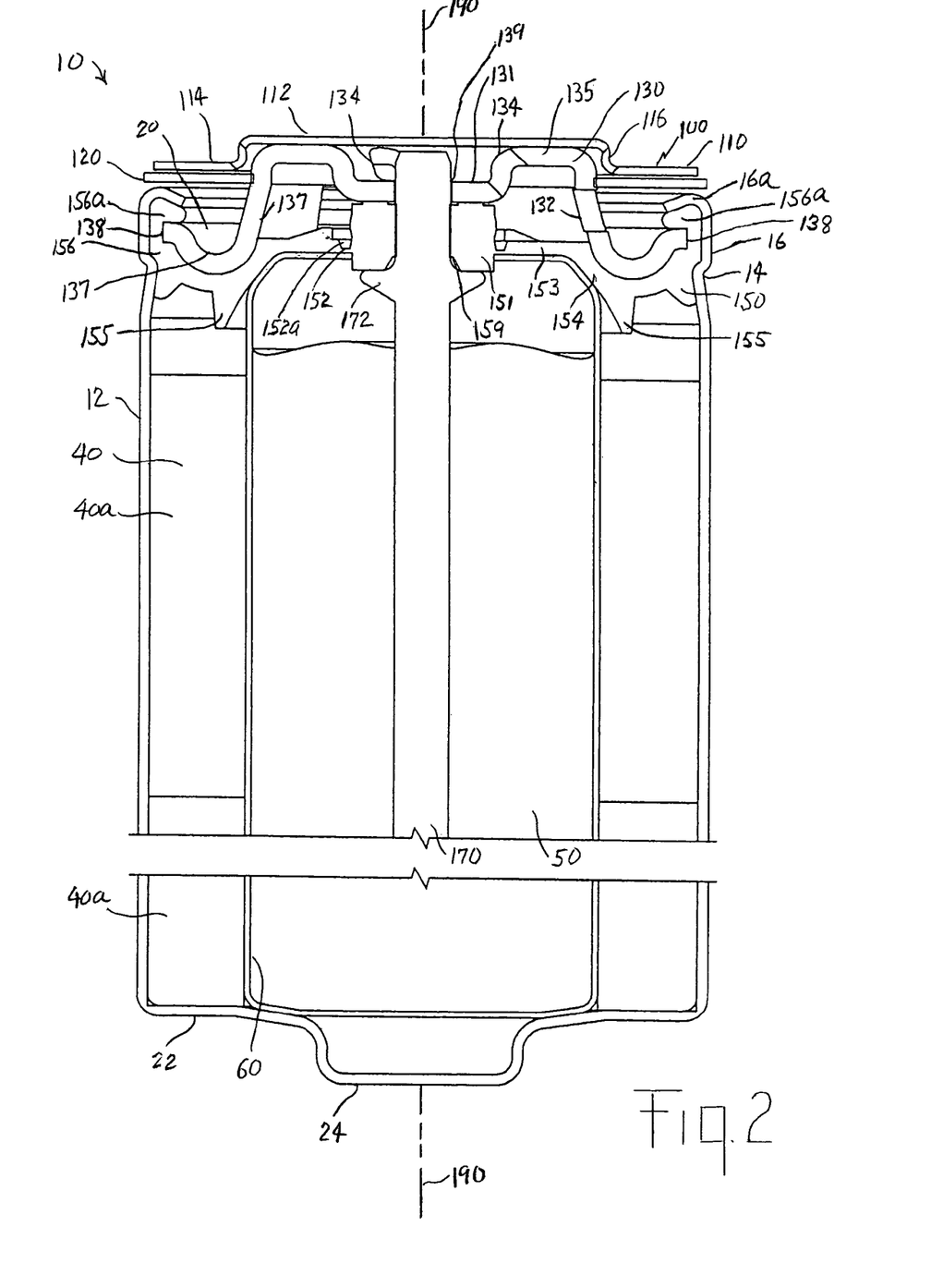
FIG. 2 is a cross sectional view of an alkaline cell containing the end cap assembly of the invention shown in FIG. 1.
Figure 3:
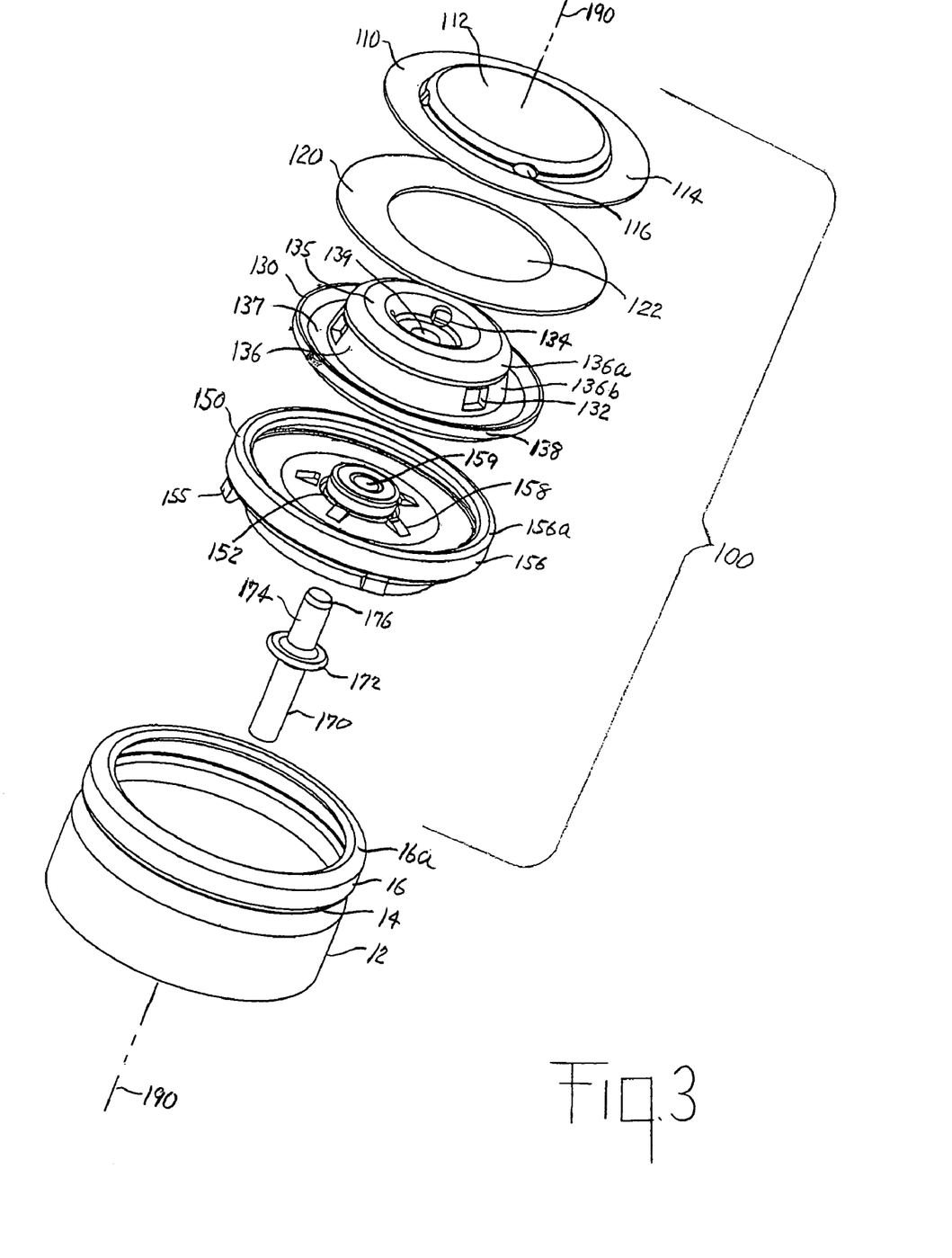
FIG. 3 is an exploded view of the components of the end cap assembly shown in FIG. 1.
Figure 4:
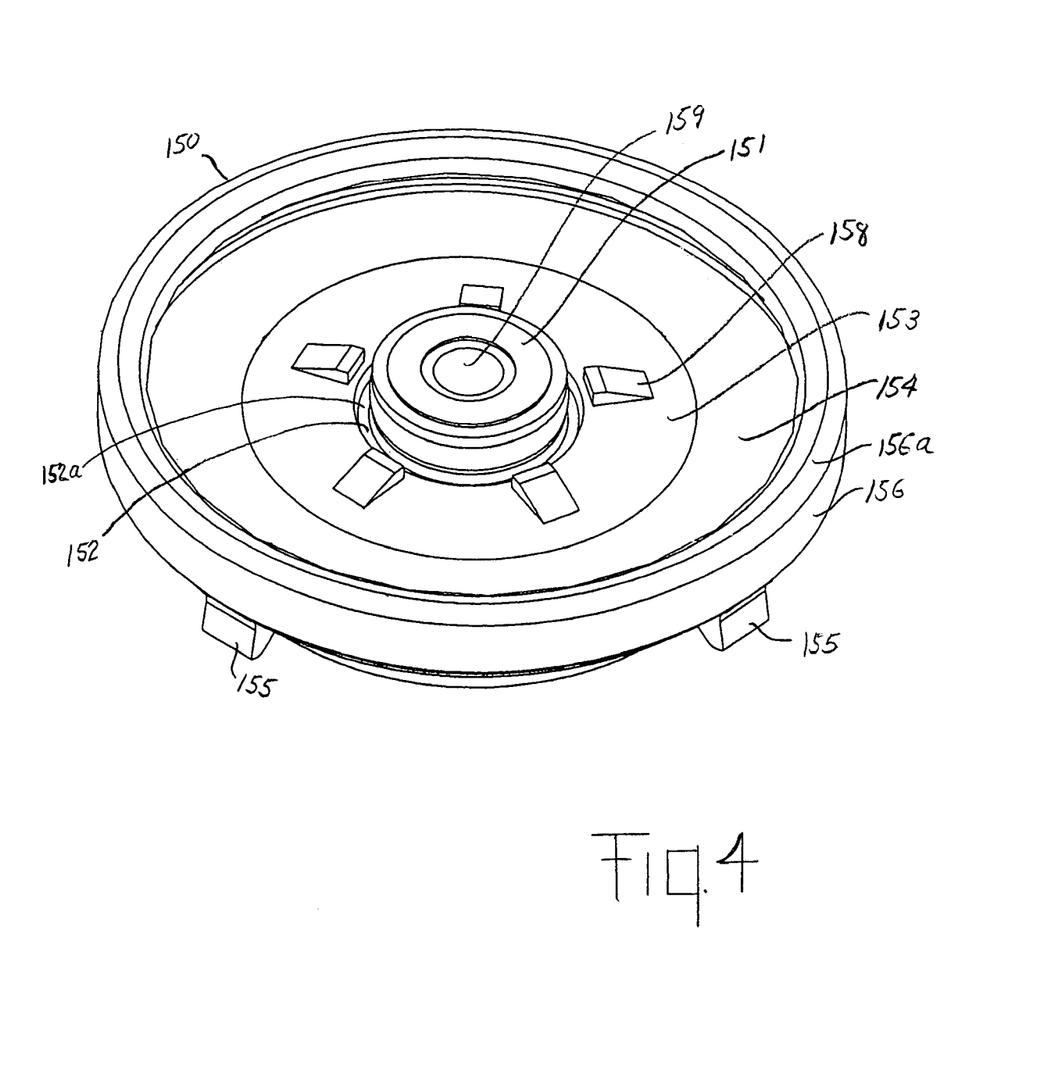
FIG. 4 is an enlarged pictorial view of the insulating sealing disk in FIG. 1 before it has been crimped in place within the cell.
Figure 5:
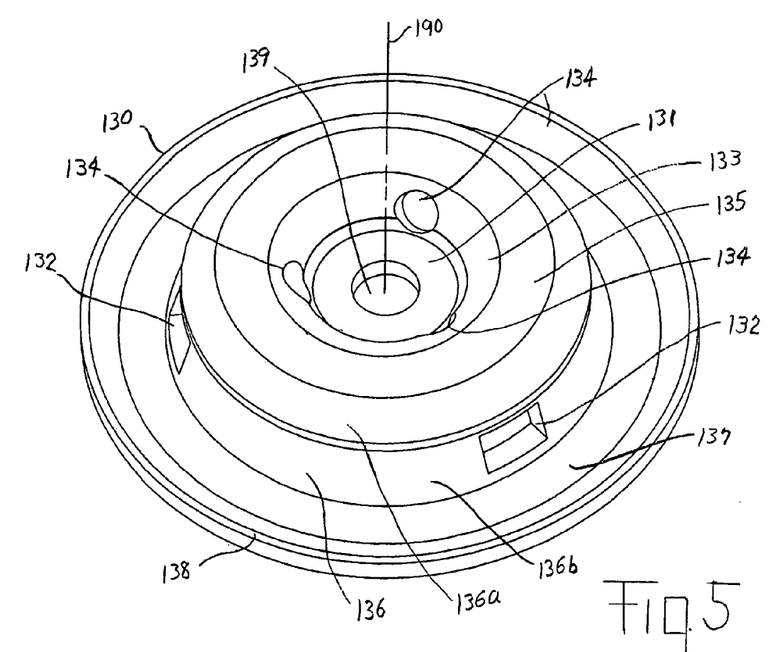
FIG. 5 is an enlarged pictorial view of the metal support disk in FIG. 1 before it has been crimped in place within the cell.
Figure 5A:
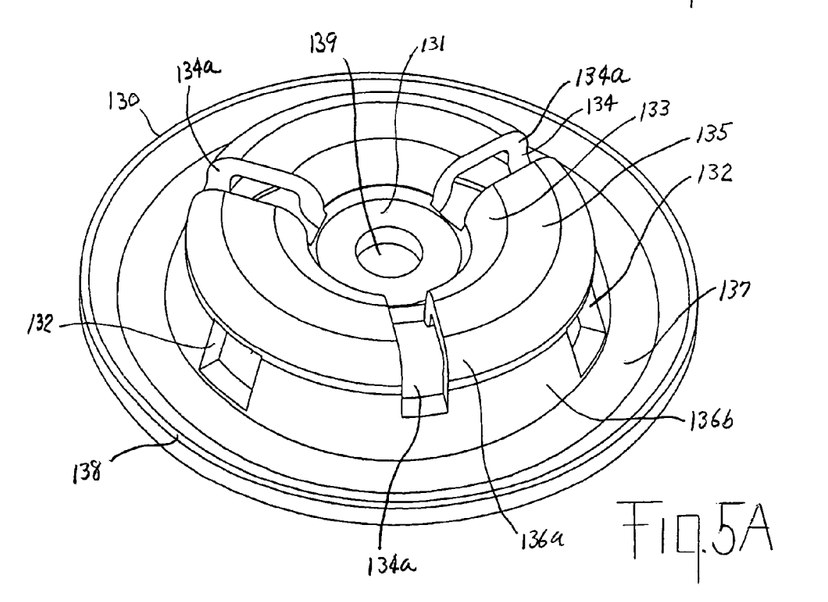
FIG. 5A is an enlarged pictorial view of an alternate embodiment of the metal support disk before it has been crimped in place within the cell.
Figure 6:
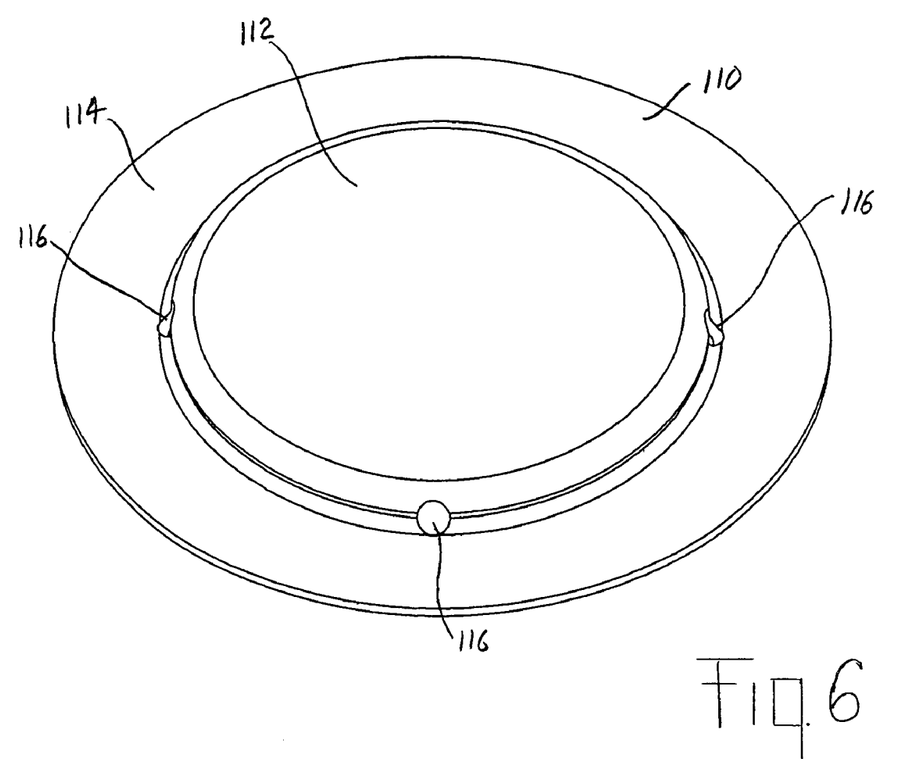
FIG. 6 is an enlarged pictorial view of the end cap shown in FIG. 1.

A preferred structure of the end cap assembly 100 of the invention is illustrated in FIG. 1. A specific embodiment of a representative alkaline cell 10 with the end cap assembly 100 integrated therein is shown in FIG. 2. An exploded view of the components of the end cap assembly 100 is shown in FIG. 3. An enlarged pictorial view of the insulating sealing disk 150 before it is crimped into the cell is shown in FIG. 4. A principal embodiment of metal support disk 130 which overlies insulating disk 150 is shown in FIG. 5 and an alternative embodiment of metal support disk 130 is shown in FIG. 5A. A principal embodiment of end cap 110 is shown in FIG. 6.

The end cap assembly 100 is particularly applicable to cylindrical electrochemical cells, particularly cylindrical alkaline cells of standard AAAA (42×8mm), AAA (44×9mm), AA (49×12mm), C (49×25mm) and D (58×32mm) size. The end cap assembly 100 provides a seal for the open end 20 of cell housing (casing) 12 and also has incorporated therein exposed end cap 110. End cap 110 is in the form of a disk and may function as one of the cell's terminal's (negative terminal for alkaline cell) as shown in FIG. 2. The end cap 110 is insulated from the cell housing 12 by insulating washer 120 which may be of paper of plastic material underlying edge 114 of end cap 110. The end cap assembly 100 may have a metal support disk 130 over the insulating sealing disk 150. After the end cap assembly 100 is formed and inserted into the open end 20 of the cell housing, the peripheral edge 16a of the housing is crimped over the upwardly extending peripheral edge 156a of sealing disk 150, and peripheral edge 156a in turn is crimped over rim edge 138 of the metal support disk 130. There is a circumferential indentation 14 on housing 12 below both peripheral edge 16a and housing portion 16. Radially forces are also applied during the crimping process causing the metal support rim 138 to bite into edge wall 156 of the sealing disk 150. The radial forces applied during crimping provides a tight seal even though the cell may be exposed to extremes in cold and hot environmental temperature.

End cap assembly 100 of the invention in the representative embodiment (FIGS. 1-3) is comprised of an end cap disk 110, an electrically insulating sealing member 150, and a metal support disk 130 between the end cap 110 and insulating sealing member 150. There is an elongated current collector 170 which passes through a central aperture in the metal support disk 130 and insulating sealing disk 150. The insulating sealing member 150 is preferably in the form of an insulating sealing disk (grommet) having a convoluted surface. Insulating sealing disk 150 is of durable plastic which is resistant to chemical and alkaline attack. Preferably sealing disk 150 is of nylon 66 or nylon 612. However it is not intended to limit sealing disk 150 to these materials, since other nylon grades could also be employed as well as polypropylene, talc filled polypropylene, polyethylene and sulfonated polyethylene and the like. Insulating sealing disk 150 has a thick central boss 151 with an aperture 159 passing therethrough for receiving a metal current collector 170. Current collector 170 can be in the form of an elongated nail, preferably having an integrally formed flange 172 spaced below head 176. Thus, when assembling the end cap assembly 100, current collector 170 is inserted through aperture 159 by pushing the current collector upper portion 174 through boss aperture 159 until flange 172 comes to rest against the top surface of metal support disk 130. The current collector head 176 can then hammered (riveted) against the top surface of metal support disk 130 thereby locking the upper portion 174 of the current collector in place within aperture 159. Current collector 170 can be selected from a variety of known electrically conductive metals found to be useful as current collector materials, for example, brass, tin plated brass, bronze, copper or indium plated brass. Preferably, the surface of current collector 170 is coated with a sealing material such as asphalt coating before insertion into aperture 159. Alternatively, the surface defining aperture 159 can be precoated with such asphalt coating before the current collector 170 is inserted therethrough. The current collector head 176 may be welded to the top surface of end cap 110 so that it makes electrical contact with end cap 110. However in the embodiment shown in FIGS. 1 and 2 the topmost surface 135 of metal support disk 130 is instead welded to end cap 110, for example, by electrical resistance welding. Current collector 170 is thereby in electrical contact with end cap 110 by the conductive pathway between the current collector 170, metal support disk 130 and end cap 110. The boss 151 is immobilized under metal support disk 130 and does not slide along current collector 170 as gas pressure within the cell increases.

The metal support disk 130 is of metal, preferably nickel plated steel having a convoluted surface. Support disk 130 has a wall thickness desirably between about 0.3 and 0.8 mm. The support disk 130 may typically have a wall thickness of between about 0.3 and 0.8 mm for an AAA size cell, about 0.5 mm for an AA cell and about 0.8 mm for a C and D cell. In the principal embodiment metal support disk 130 is shaped having a depressed central hub 131 with central aperture 139 therethrough (FIGS. 5 and 5A). The edge of central hub 131 merges into upwardly extending inner wall 133 which terminates in top flat surface 135 (FIG. 5). The outer edge of top flat surface 135 extends into downwardly sloping outer wall 136. The upper portion 136a of downwardly sloping wall 136 is preferably beveled as shown in FIGS. 3 and 5. Downwardly sloping outer wall 136 terminates in circumferential trough 137 which in turn terminates in upwardly extending rim edge 138. Thus metal support disk as shown in FIG. 5 has a major surface convolution defined by upwardly extending inner wall 133, top flat surface 135 and downwardly extending outer wall 136. Preferably a group of primary vent apertures 132 are formed in the downwardly extending outer wall 136 along the circumference thereof. The metal support disk 130 preferably has a group of secondary vent apertures through the inner wall 133 along the circumference thereof. The primary vent apertures 132 and secondary vent apertures 134 may be of varying shape and size. For example, they may be circular, elliptical or polygonal and may also be irregularly shaped, for example, the perimeter of apertures 132 and 134 may have a portion which is curvilinear and another portion which is straight. In a preferred embodiment (FIG. 5) primary vent apertures 132 are shown as having a rectangular shape and secondary apertures 134 are shown as having a circular shape. The primary vent apertures 132 (FIG. 5) are spaced apart along a circumferential path having an average radius $R_1$ from the central longitudinal axis of metal support disk 130. The secondary apertures 134 (FIG. 5) are spaced apart along a circumferential path having an average radius $R_2$ from the central longitudinal axis of the metal support disk 130, wherein $R_2$ is less than $R_1$.

An alternative embodiment of metal support disk 130 is shown in FIG. 5A. This embodiment is essentially the same as that shown in FIG. 5 with the primary vent apertures 132 located in spaced apart relationship along the circumference of the downwardly extending outer wall 136. However, the secondary vent apertures are shown in the configuration of a plurality of slots 134a which pass through the outer wall 136 and also cut through the flat top surface 135 of metal support disk 130. Thus, in the first embodiment of metal support disk (FIG. 5) when gas pressure within the cell builds up to a predetermined threshold level, circumferential thin membrane 152 (FIGS. 2 and 4) ruptures thereby allowing gas to escape rapidly from the cell through the primary and secondary vent apertures 132 and 134 within metal support disk 130 and finally through apertures 116 in end cap 110. When the metal support disk 130 is configured as shown in FIG. 5A with the secondary vent apertures in the form of slots 134a, gas may escape even more rapidly from the cell interior when membrane 152 ruptures.

Insulating sealing disk 150 (FIGS. 2, 3, and 4) is desirably injection molded in its entirety preferably using nylon 66 or nylon 610 polymer. The insulating sealing disk 150 has a central boss 151 which has emanating from its body surface an integrally formed radially extending arm 153 circumventing boss 151. The annular portion of arm 153, which abuts boss 151, is a thinned portion forming a rupturable membrane 152 circumventing boss 151. Circumferential membrane 152 is designed to have a thickness so that it ruptures when gas pressure within the cell builds up to a predetermined level. In the preferred embodiment circumferential membrane 152 underlies an annular grooved or recessed region 152a circumventing boss 151 (FIG. 4). Alternatively, the circumferential membrane 152 my overlie annular groove 152a, that is, annular groove 152a may face the interior of the cell. Annular groove 152a is preferably located so that the leading edge of said groove, being the edge of groove 152a nearest boss 151, is within about 2 mm from said boss surface.

A plurality of spaced apart raised protrusions (standoffs) 158 are integrally formed and extend upwardly from the top surface of radially extending circumferential arm 153 (FIG. 4). These protrusions (standoffs) 158 serve to deflect portions of the rupturing membrane 152, which may break away during rupture when the internal gas pressure rises beyond a predetermined level. During membrane 152 rupture, the standoffs 158 deflect breaking pieces of membrane 152 away from the primary vent apertures 132 in metal support disk 130, that is, so that they do not plug said vent apertures 132. As shown best in FIG. 4 radially extending arm 153 terminates in an integrally formed downwardly extending arm 154 which circumvents radial arm 153. Downwardly extending arm 154 terminates along its bottom surface in a plurality of spaced apart legs 155 which circumvent boss 151 and protrude into the cell interior as shown best in FIGS. 2 and 4. An upwardly extending edge wall 156 extends upwardly from the edge of arm 154 to form peripheral edge 156a, which is crimped over the rim edge 138 of metal support disk 130 after the end cap assembly 100 is inserted into the open end 20 of cell housing 12.

During cell construction the cathode material 40, anode material 50 with separator 60 therebetween are first inserted into the cell interior. An end cap subassembly comprising the sealing disk 150, metal support disk 130 and current collector 170 can then be formed with the current collector 170 locked in place within sealing boss aperture 159 and metal support central aperture 139 as above described. This subassembly can then be inserted into the open end 20 of the cell housing 12. The edge 16a of the housing can then be crimped over peripheral edge 156a of insulating sealing disk 150 so that the sealing disk edge 156a in turn becomes crimped over rim edge 138 of metal support disk 130 as above described. An insulating washer 120, preferably of heavy paper (Kraft paper) or durable plastic material, may then be inserted over metal support disk 130 so that the top flat surface 135 of metal support disk 130 protrudes from aperture 122 of washer 120. The end cap 110 is inserted over metal support disk 130, and the bottom surface of the raised central portion 112 of end cap 110 is then welded to the to flat surface 135 of the metal support disk 130, by electrical resistance welding or equivalent. Thus, a completed cell 10 is formed within end cap assembly 100 securely in place to tightly close the open end 20 of cell housing 12. In the specific embodiment of a high power alkaline cell shown (FIG. 2), the negative current path is from anode 50 to current collector 170 to metal support disk 130 to end cap 110. The positive current path is from cathode 40 to housing 12 to positive terminal 24 at housing closed end 22.

In a preferred embodiment the high power primary cell 10 may be a high power nickel oxyhydroxide primary cell with an anode 50 comprising zinc, a cathode comprising nickel oxyhydroxide, and an electrolyte comprising aqueous potassium hydroxide. (Hereinafter termed a nickel oxyhydroxide primary cell.) Such cell is inherently very active so that it can maintain its voltage output (e.g. between about 0.9 and 1.5 volt) at high current drain e.g., well over 1 Amp, for relative long periods. Thus when such cell, for example, an AA size cell, is subjected to an abusive short circuiting test, the cell internal temperature can become very hot within just 2 to 3 minutes. Under these conditions the current drain is very high averaging well over 2 Amp for at least 2 to 3 minutes. If the short circuit discharge is left uninterrupted the $I^2R$ heating within the cell interior can cause the cell housing outside skin temperature to reach levels over 200° C. and even over 250° C. within a span of just 2 to 3 minutes. As the cell's internal temperature increases, the rate of secondary electrochemical reactions increase. These reactions are exothermic and generate additional heat. As the cell's internal temperature increases, the secondary reactions generate more gasses and gas pressure within the cell rises. In the nickel oxyhydroxide alkaline cell such secondary reactions, for example, involve generation of hydrogen gas from the reaction of zinc and water and generation of oxygen from reaction of nickel oxyhydroxide and water. The gas pressure within the cell also rises rapidly as temperature increases (gas pressure rises directly proportional to absolute temperature according to Charles law, assuming ideal gas behavior). If such short circuit discharge and continued cell heating is left unabated, a potentially hazardous condition may occur, which can lead to a cell rupture with accompanying disbursement of materials and metal parts into the surrounding environment.

In addition to protection from catastrophic failure, cells must also pass temperature specification guidelines established by various agencies such American National Standards Institute (ANSI). An implied limit for the cell housing outside surface temperature caused by any abusive cell use or other abusive condition is between about 150° C. and 160° C. The combination of vent and end cap assembly features disclosed herein serve to prevent the housing surface from approaching this limit without the need to use PTC (positive thermal coefficient) devices within the cell or other thermal responsive members such as bimetallic members or shape memory alloys. It has been determined from experimentation that if the zinc/nickel oxyhydroxide cell can be designed to vent before the housing skin temperature rises to 160° C., for example, in an abusive short circuit condition, the internal gas pressure within the cell will not rise beyond a level of about 1000 psig. A catastrophic cell failure or rupture can then be avoided. (The cell housing 12 wall thickness is typically between about 0.15 and 0.3 mm. For example, for an AA size cell the housing 12 wall thickness may typically be about 0.2 mm and for a C or D cell the housing 12 wall thickness may be about 0.25 mm employing nickel plated cold rolled steel.) The prior art may point in the direction of incorporating a PTC (positive thermal coefficient) device in series with an electrode to protect against rapid increase in cell temperature. (In a PTC device resistance increases with temperature thereby shutting down the current drain.) Or else the art may point to the use of other thermally responsive devices such as bimetallic disks or shape memory alloys which deflect and thus break the cell's internal circuit when subjected to elevated temperature. (U.S. Pat. Nos. 5,879,832 and 6,083,639) Such devices while very effective consume space within the end cap assembly and add to the cost of the cell. These devices thus have a greater utility for secondary (rechargeable) cells.

It has been determined, quite surprisingly, that the housing skin temperature of a high power cell, such as a nickel oxyhydroxide primary alkaline cell, may be kept from reaching a danger zone of between about 150° C. and 160° C. by augmenting the venting system normally associated with alkaline cell design. This obviates the need to add PTC or other thermally responsive devices such as bimetallic disks or shape memory alloys. More specifically Applicant has incorporated in the preferred cell design (FIGS. 1-6) a combination of venting mechanisms which function in tandem. The improvement is as follows:

a) A circumferential rupturable membrane 152 is integrally formed from an annular thinned region within a radially extending arm 153 of insulating sealing disk 150. The circumferential or annular membrane 152 preferably underlies a circumferential groove 152a on the surface of radial arm 153. Circumferential membrane 152 is preferably located at or proximal to the juncture between radial arm 153 and boss 151 of insulating sealing disk 150. Membrane 152 may have a thickness typically between about 3 and 12 mils (0.076 and 0.30 mm), for example, about 8 mil (0.203 mm) when the membrane is integrally molded into the radial arm 153. This allows a membrane 152 of nylon, for example, to rupture at pressures less than about 1000 psig ($689.4 \times 10^4$ pascal gage). The membrane 152 thickness can be made even thinner, for example, a thickness as low as about 3 mil (0.0762 mm) and even somewhat thinner by applying a knife or cutting edge to a surface of the membrane to cut into it along the circumference or portion thereof. The width of overlying annular groove 152a may typically be between about 0.1 and 1.0 mm using a sealing disk 150 of nylon.

b) The metal support disk 130 has incorporated therein preferably a combination of both primary and secondary vent apertures. These vent apertures pass through the surface of the support disk (FIGS. 5 and 5A). When end cap assembly 100 is in place, the primary vent apertures 132 (first group of vent apertures) and secondary vent apertures 134 (second group of vent apertures) desirably lie above the rupturable membrane 152 closer to the end cap 110. (The vent apertures are spaced apart from each other and are thus shown as individual apertures.) Desirably, the centers of the primary vent apertures 132 are at an average distance $R_1$ from the central longitudinal axis 190 of the metal support disk 130 and the secondary vent apertures 134 are at an average distance $R_2$ from the central longitudinal axis 190 of the metal support disk 130, wherein $R_2$ is less than $R_1$. Preferably the centers of the primary vent apertures 132 lie substantially in a plane along a circumferential path at an average radius, $R_1$ as measured from the central longitudinal axis 190 of the metal support disk 130. $R_1$ is about 4.25 mm for an AA size cell. The centers of the secondary vent apertures 134 lie substantially in a plane along a circumferential path at an average radius, $R_2$ from the central longitudinal axis 190 of the metal support disk 130. $R_2$ is about 1.75 mm for an AA cell. (Desirably $R_2$ is at least 2 mm less than $R_1$.) The primary vent apertures 132 are preferably located in spaced apart relationship along a circumferential path on the outer downwardly sloping wall 136b of metal support disk 130. The secondary vent apertures 134 are preferably located on along a circumferential path on the upwardly extending inner wall 133 of the metal support disk 130, which is closer to the central hub 131 and central longitudinal axis 190 of said metal support disk 130 than the primary vent apertures 132. In an alternative embodiment the secondary vent apertures are in the form of slots 134a which cut through the inner wall 133 and also cut through the top surface of metal support disk 130 (FIG. 5A).

In a preferred embodiment (AA size cell) there may be between about 2 and 4 primary vent apertures 132, desirably about 3 primary apertures 132 of rectangular shape of 1.5 mm height in the cell's longitudinal direction and 2.0 mm length in the cell's circumferential direction. The primary vent apertures 132 may typically be equispaced around the surface of outer arm 136b of the metal support disk 130. There may be between about 2 and 4 secondary vent apertures 134, desirably about 4 secondary vent apertures 134, typically of circular shape having a diameter between about 0.5 mm and 1.5 mm equispaced around the surface of inner arm 133 of metal support disk 130. For AA size cells the primary apertures 132 may typically have a total cross area of between about 6 and 12 mm$^2$ and secondary apertures 134 may typically have total cross area of between about 0.40 and 7.1 mm$^2$. (The cross area is defined as the area determined by a plane perpendicular to the aperture's longitudinal axis.)

c) For larger cell sizes, for example, C and D cell sizes, there may be between about 2 and 6 primary vent apertures 132, desirably about 3 primary apertures 132 of rectangular shape of 1.5 mm height in the cell's longitudinal direction and 2.0 mm length in the cell's circumferential direction. Also for such larger cell sizes, for example C and D cell sizes, the secondary vent apertures 134 may be circular having a diameter between about 0.5 and 2.0 mm and there is desirably between about 2 and 6 secondary vent apertures 134 spaced apart around the surface of inner arm 133 of the metal support disk 130. For C and D cells the primary apertures 132 may typically have a total cross area of between about 6 and 18 mm$^2$ and secondary apertures 134 may typically have total cross area of between about 0.40 mm$^2$ and 18.8 mm$^2$.

d) A plurality of spaced apart protrusions 158 (standoffs) a integrally formed on the surface of radially extending arm 153 of insulating sealing disk 150 to prevent pieces of ruptured membrane 152 from spraying into and clogging primary vent apertures 132 within metal support disk 130.

e) End cap 110 has included therein a plurality of spaced apart vent apertures 116 (FIG. 6), which may typically be about 0.5 mm in diameter.

A high power cell having an anode 50 comprising zinc, a cathode 40 comprising nickel oxyhydroxide and alkaline electrolyte comprising aqueous potassium hydroxide having the above described configuration as shown and described in FIGS. 1-6 for an AA size cell can have a membrane 152 which will ruptures when gas pressure builds up to a level below 1000 psig. By adjusting the membrane 152 thickness within the above described values between about 3 and 12 mil (0.0762 and 0.305 mm), desirably between about 3 and 8 mil (0.0762 and 0.203 mm), typically between about 6 and 10 mil (0.152 and 0.254 mm) such membrane 152 can be designed to rupture at the desired gas buildup pressures within the cell depending on cell size. In an AA size cylindrical cell the membrane 152 will rupture pressure desirably between about 300 and 950 psig ($206.8 \times 10^4$ and $654.9 \times 10^4$ pascal gage), preferably a pressure of between about 300 and 750 psig ($206.8 \times 10^4$ and $517.1 \times 10^4$ pascal gage). In a AA size cell the membrane 152 may rupture at other pressures within the above ranges, for example, between about 500 and 950 psig ($344.7 \times 10^4$ and $654.9 \times 10^4$ pascal. In a C size cylindrical cell the membrane 152 will rupture when the gas pressure within the cell is desirably between about 100 and 400 psig ($689.4 \times 10^3$ and $275.8 \times 10^4$ pascal gage). In a D size cylindrical cell the membrane 152 will rupture when the gas pressure within the cell is desirably between about 50 and 250 psig ($344.7 \times 10^3$ and $172.4 \times 10^4$ pascal gage). In an AAA size cylindrical cell the membrane 152 will rupture when the gas pressure pressure within the cell is between about 450 and 1150 psig ($310.2 \times 10^4$ and $792.8 \times 10^4$ pascal gage).

In each case when the membrane 152 ruptures gas within the cell will escape very rapidly to the external environment, because of the multiple venting system herein described employing both primary and secondary vents 132 and 134, respectively, as shown in FIG. 5 or primary and secondary vents 132 and 134a, respectively, as shown in FIG. 5A. (The standoffs 158 emanating from the surface of insulating sealing disk 150 divert the spray of ruptured membrane to prevent clogging of the primary vent apertures 132.) Gas escapes through the primary and secondary vents 132 and 134. A portion of the gas emanating from the primary and secondary vents 132 and 134 passes under insulating washer 120 through to the environment. The remaining portion of the gas passes to the environment through vent cap apertures 116.

It has been determined that the above described venting system of the invention has particular utility when incorporated into the end cap assembly 100 and applied to a high power primary cell, for example, a high power nickel oxyhydroxide primary cell. In such application even if the cell is subjected to an extremely abusive condition such as direct and prolonged short circuiting, the membrane 152 will rupture and the venting system above described which includes primary and secondary vent apertures 132 and 134, respectively allow gas to escape quickly enough from the cell interior in order to keep the housing 12 skin temperature from reaching a temperature much above about 150° C. It has been determined that such effect can be achieved if the membrane 152 is designed to rupture when gas pressure within the cell reaches a threshold level under 1000 psig (689.4×10⁴ pascal gage). In particular with a zinc/nickel oxyhydroxide alkaline cell, venting gases from the cell with the end cap assembly 100 before the internal gas pressure reaches a level of about 1000 psig (689.4×10⁴ pascal gage) assures that the housing 12 outside surface skin temperature remains at a temperature below 160° C., when the cell is subjected to continuous short circuit conditions. A rupturable membrane 152 of nylon having thickness between about 3 and 12 mil, preferably between about 3 and 8 mil, will rupture before gas pressure within the cell (AAA, AA, C or D cell) reaches 1000 psig (689.4×10⁴ pascal gage). The venting system of the invention as shown in end cap assembly 100 allows gas to escape rapidly from the cell which in turn causes a very rapid reduction in the cell internal temperature and housing 12 skin temperature. This in effect prevents runaway electrochemical reaction from occurring and prevents further gas pressure buildup, thus preventing a catastrophic rupture of the cell housing 12 even though the cell is still being short circuited.

The rapid reduction in cell internal temperature resulting from the release of gas pressure buildup with the venting system of the invention (end cap assembly 100) may be the result of two phenomenons. If there is any liquid water remaining in the cell (subcooled liquid under elevated pressure) before membrane 152 rupture, such liquid will flash to the environment along with the escaping gases. As such liquid flashes, its heat of vaporization removes heat from the cell interior. Also as gas under elevated temperature $T_1$ and elevated pressure $P_1$ escapes from the cell's volume through the venting system of the invention (end cap assembly 100), the gas remaining in the cell undergoes a classic thermodynamic blow-down until a final gas temperature $T_2$ and pressure $P_2$ is reached.

If it is assumed, for example, that the cell is sufficiently insulated, the gas remaining in the cell undergo a reversible adiabatic (isentropic) blow down wherein the change in molar entropy is 0 ($\Delta S=0$) per mole of gas remaining in the cell. (The reversible conditions come about because as the blow down occurs the gas molecules remaining in the cell experience a chain of infinitesimal decreases in surrounding pressure and temperature.) From the first law of thermodynamics $dU=dQ-dW$. It can be shown from combination of the first and second laws of thermodynamics for a reversible change of state that $dU-Tds+pdv=0$, where dU is the differential change in internal energy of the gas, Tds is the reversible heat, and pdv the reversible work done on the gas. Assuming a reversible adiabatic change of state and ideal gas law behavior, $TdS=0$ and the following relationships can be derived for the gas remaining in the cell. (See, derivations for reversible change of state of gases in Barnett F. Dodge, *Chemical Engineering Thermodynamics*, McGraw-Hill (1944), p. 270). From the first and second laws the following two equations can be derived and applied. Assuming ideal gas behavior PV=RT per mole and a reversible adiabatic change of state:

$$TdS=dQ=C_v dT+Pdv=0 \tag{Eq. 1}$$

and $$TdS=dQ=C_p dT-RT\, dP/P=0 \tag{Eq. 2}$$

These equations upon integration result in the following relationship for a reversible adiabatic blow down of gas from a fixed tank or cell.

$$[V_1/V_2]^{(k-1)}=T_2/T_1=[P_2/P_1]^{(k-1)/k} \tag{Eq. 3}$$

In the above equation (Eq. 3) $V_1$ and $V_2$ are the initial and final molar specific volumes of the remaining gas in the cell; $T_1$ and $T_2$ are the absolute initial and final temperatures of the remaining gas in the cell; $P_1$ and $P_2$ are the initial and final pressure of the gas remaining in the cell (the blow down may be left to continue until $P_2$ is at atmospheric pressure); k is the ratio of molar specific heat capacity $C_p$ divided by the molar specific heat capacity $C_v$ for the gas (for diatomic gases, e.g. $H_2$, k=1.40); and $R=C_p-C_v$. Thus, from Eq. 3 it may be seen that the drop down in cell internal temperature can be very significant when internal gas pressure drops from a relatively high level, $P_1$, of above 1000 psig to a much lower level, $P_2$ of about 500 psig or 100 psig or 10 psig. In reality there is not full adiabatic conditions and there will also be heat loss through the housing wall. And as above mentioned any liquid present in the cell at the time of venting will flash into vapor with its heat of vaporization lowering the cell's internal temperature further. Also the above equations are not concerned with and do not reflect venting rate. It will be appreciated that the venting system of the invention is designed to make significant blow down in the cell's internal gas pressure, for example, from an internal pressure of about 1000 psig to about 500 psig or to about 100 psig as rapid as possible, e.g. typically within only a few seconds, or even less than a second of venting activation. Additionally the inclusion of the secondary vent apertures 134 provides added protection to assure that there will be sufficient vent openings in case one or more of the primary vent apertures become clogged during rupture of the membrane 152. Protrusions (standoffs) 158 jutting from the surface of the insulating seal surface 158 are designed to deflect debris from ruptured membrane 152 to reduce the chance of such debris clogging primary vents 132.

In sum it has been determined that the venting system of the present invention as shown and described with respect to end cap assembly 100 provides effective and safe release of gas pressure in a high power primary cell, for example, a high power nickel oxyhydroxide primary alkaline cell to assure that the cell housing will not rupture even if the cell is subjected to abusive prolonged short circuit discharge conditions. In a preferred embodiment the cell housing 12 can be of nickel plated cold rolled steel of thickness between about 0.15 and 0.3 mm. The annular rupturable membrane 152 may be of nylon having a thickness between about 3 and 12 mil (0.0762 and 0.301 mm), typically between about 6 and 10 mil (0.152 and 0.254 mm). A combination of primary and secondary vent apertures 132 and 134, respectively, through the metal support disk 130 are employed as above described. The surface of the insulating sealing disk 150 has a plurality of spaced apart integrally formed protrusions (standoffs) 158 as above described to deflect pieces of ruptured membrane 152 so that they do not enter and clog the primary vent apertures 132. The venting system of the invention as shown and described with respect to end cap assembly 100 can be applied generally irrespective of cell size, for example, they apply to cylindrical cell sizes such as AAAA, AAA, AA, C, and D size cells and could also be applied to flat cells wherein one or more of the housing sides are substantially flat.

The end cap assembly 100 with venting system of the invention therein as above described may be applied beneficially to any high power primary cell and in particular high power alkaline cell. Such cell 10 (FIG. 2) for example, may have an anode 50 comprising zinc, a cathode 40 comprising manganese dioxide and conductive carbon such as graphite and a separator 60 therebetween. An alkaline electrolyte, preferably aqueous potassium hydroxide is added to both anode and cathode. The cell may typically contain additives to the anode or cathode or both which improves the high power performance of the cell. For example, the cell may contain zinc fines in the anode as described, for example, in U.S. Pat. No. 6,521,378 B2, herein incorporated by reference in its entirety. The addition of the zinc fines to the anode improves the rate capability and power output of the cell making the zinc/$MnO_2$ alkaline cell in effect a high power cell. The end cap assembly 100 of the invention, thus, may be used effectively in connection with such cell.

However, the end cap assembly 100 with the venting system of the invention therein as above described has even greater utility as a sealing closure for primary cells which can sustain high power output, for example, at least a continuous 1 Watt output for longer periods of time than the conventional Zinc/$MnO_2$ alkaline cell. The term high power cell as used herein is defined as a fresh cell that is capable of generating at 1.2 Watt-hrs of energy when subjected to a constant continuous power drain of 1 Watt. Thus, end cap assembly 100 with a venting system of the invention therein as above described and as shown in the figures, preferably in conjunction with annular rupturable membrane 152, has particular utility has a sealing and venting system for high power nickel oxyhydroxide primary cells.

A specific example of a nickel oxyhydroxide primary cell employing the end cap assembly 100 of the invention with improved venting system therein is shown in FIG. 2. The cell may be any size including AAAA, AAA, AA, C and D size. An AA size cell is shown in FIG. 2. With reference to the drawings a specific example of an AA nickel oxyhydroxide primary cell employing the end cap assembly 100 of the invention is as follows:

EXAMPLE (NICKEL OXYHYDROXIDE PRIMARY ALKALINE CELL)

An AA size cylindrical cell 10 is shown in FIG. 2. The anode 50 comprises a slurry of zinc particles. The cathode 40 comprises nickel oxyhydroxde and conductive carbon. Both anode and cathode includes electrolyte comprising an aqueous solution of potassium hydroxide. The housing 12 may of nickel plated cold rolled steel of thickness between about 0.2 mm and 0.6 mm. A separator 60 comprising cellulosic and polyvinylalcohol fibers, conventionally used in alkaline cells as above described, can be used in cell 10. After the cell is filled with anode 50 and cathode 40, the end cap assembly 100 of the invention is inserted and crimped in place with housing edge 156a as above described to close and seal the open end 20 of the cell. Insulating seal 150 is preferably of nylon and has an annular rupturable membrane 152 (FIGS. 2 and 4) having a membrane thickness of between about 3 and 10 mil (0.0762 mm and 0.254 mm), typically between about 6 and 10 ml (0.152 and 0.254 mm). There are three primary rectangular vent apertures 132 of 1.5 mm height in the cell's longitudinal direction and 2.0 mm in length in the cell's circumferential direction. These primary vent apertures are evenly spaced circumferentially around outer arm 136a of the metal support disk 130 as shown in FIG. 5. There are four secondary vent apertures 134 of circular diameter 0.5 mm evenly spaced around the inner arm 133 of metal support disk 130.

There are five equally spaced integrally formed wedge shaped protrusions 158 (standoffs) emanating from the to surface of insulating sealing disk 150 as shown in FIG. 4. Each standoff 158 has a length of about 1.2 mm and a width of about 0.75 mm and typically a maximum height of about 0.55 mm. There are five vent holes 116 in end cap 110 as shown in FIG. 6. These vent holes have a diameter of about 0.5 mm. When membrane 152 ruptures, gas from the cell interior passes through the primary and secondary vent apertures 132 and 134, respectively, within the metal support disk. The gas then passes from the cell through the unsealed space under insulating washer 120 and also through vent holes 116 in end cap 110.

The cathode material 40 may be inserted in the form of one or more slabs 40a having a central core devoid of cathode material (FIG. 2). The outside surface of each slab 40a contacts the inside surface of housing 12 (FIG. 2). The central core is filled with anode material 50 with separator 60 therebetween.

The anode 50 and cathode 40 may have the following representative composition:

TABLE 1

Cathode Formulation

| Component | Formulation (wt %) |
|---|---|
| NiOOH[1] | 85 |
| Natural graphite[2] | 8 |
| Polyethylene binder[3] | 1 |
| Electrolyte solution[4] | 6 |

Notes:
[1]The NiOOH powder is comprised primarily of beta-nickel(+3) oxyhydroxide having a mean average particle size of about 19 microns. The NiOOH particles have a surface coating of cobalt oxyhydroxide in the total amount of about 4 percent by weight of the pure NiOOH. Thus, the actual amount of active NiOOH comprise may about 85/1.04 = 81.7 percent by weight of the cathode. The cobalt oxyhydroxide-coated beta-nickel oxyhydroxide is available from Kansai Catalyst Co.,Ltd.(Osaka, Japan).
[2]Graphite NdG-0507 is a natural graphite having an average particle size of about 7 microns, a BET surface area of about 10 $m^2/g$, a crystallite size, Lc >200 nm, and is available from Nacional de Grafite (Itapecerica, MG Brazil).
[3]Polyethylene binder under the trade designation "Coathylene" from Hoechst Celanese.
[4]The electrolyte solution contains 38 percent by weight of dissolved KOH and about 2 percent by weight of dissolved zinc oxide in water.

The nickel oxyhydroxide was a cobalt oxyhydroxide coated beta-nickel oxyhydroxide. A typical cobalt oxyhydroxide coated beta-nickel oxyhydroxide has the following nominal composition: NiOOH 90.2 wt %; CoOOH 6.6 wt %, NaOH 1.5 wt %, moisture 1.6 wt %.

TABLE 2

Anode Formulation

| Component | Formulation (wt %) |
|---|---|
| Zinc Particles[1] (−20/+200 mesh) | 64.00 |
| Gelling agent 1[2] | 0.52 |
| Gelling agent 2[3] | 0.04 |
| Surfactant[4] | 0.11 |

TABLE 2-continued

Anode Formulation

| Component | Formulation (wt %) |
| --- | --- |
| Gassing inhibitor[5] | 0.03 |
| Electrolyte[6] | 35.30 |

Notes:
[1] Zinc-based particles passed through sieve square opening sizes between 200 mesh (0.075 mm) and 20 mesh (0.850 mm). The zinc-based particles had a mean average particle size of about 370 microns and were alloyed and plated with indium to give a total indium content of about 350 ppm.
[2] A polyacrylic acid-based gelling agent available under the tradename Carbopol 940 from B.F. Goodrich Co.
[3] A grafted starch-based gelling agent available under the tradename Waterlock A221 from Grain Processing Corp.
[4] An organic phosphate ester-based surfactant available in the form of a 3 wt % solution under the tradename RM 510 from Rhône Poulenc.
[5] Indium acetate added as an inorganic gassing inhibitor.
[6] The electrolyte solution contained 35.4 percent by weight of dissolved KOH and about 2 percent by weight of dissolved zinc oxide.

The cell is subjected to direct and continuous short circuiting. The cell's power output during short circuiting was well above 1 Watt and the current drain was well above 2 amp. The housing 12 outside surface temperature (skin temperature) was monitored. Within about only a few minutes the housing skin temperature rose to a level over 100° C. Before the housing skin temperature reached a level of about 160° C. the annular membrane 152 ruptured as intended thereby releasing the cell gasses safely to the environment through the venting system of the invention as intended. The annular membrane 152 as above described was designed to rupture before accompanying gas buildup within the cell reached a pressure of 1000 psig (689.4×10⁴ pascal gage). The cell's housing surface temperature (skin temperature) continued to drop even though the short circuit conditions were maintained. A significant drop in cell gas pressure and accompanying drop in cell housing skin temperature occurred very quickly, within seconds of activation of the venting system of the invention through rupture of membrane 152. Thus, the venting system of the invention successfully and safely prevented any catastrophic rupture of the cell housing or catastrophic decrimping of the end cap assembly, although the cell was subjected to the extremely abusive short circuit condition.

Although the invention has been described with reference to specific embodiments, it should be appreciated that other embodiments are possible without departing from the concept of the invention and are thus within the claims and equivalents thereof.

What is claimed is:

1. A primary electrochemical cell comprising a negative and a positive terminal and an elongated outer housing having a closed end and opposing open end, and an end cap assembly inserted therein closing said housing, wherein said cell has a central longitudinal axis running in the direction of elongation of said housing, wherein
the end cap assembly comprises an end cap, and an insulating sealing member underlying said end cap, and a support member between said end cap and said insulating sealing member, when the cell is viewed in vertical position with the end cap assembly on top; said support member being formed of a support disk of single piece metallic construction having a first group of vent apertures and a second group of vent apertures therethrough, wherein each of said groups of vent apertures comprises at least a plurality of individual apertures, wherein the vent apertures in said first group are spaced apart from the vent apertures in said second group in the radial direction away from the cell's central longitudinal axis.

2. The electrochemical cell of claim 1 wherein the cell comprises an alkaline electrolyte and said cell is capable of generating high power defined as being capable of generating at least 1.2 watt-hours when subjected to a continuous constant power output of 1 Watt.

3. The electrochemical cell of claim 1 wherein said insulating member comprising an insulating sealing disk abutting the cell housing and electrically insulating said support disk from the cell housing; said insulating sealing disk having a central boss and an integrally formed radial arm extending from said boss; wherein said radially extending arm forms a surface; said radially extending arm having a thinned portion therein forming a rupturable membrane which underlies said end cap when the cell is viewed in vertical position with the end cap assembly on top; wherein said membrane ruptures when gas pressure within the cell rises thereby allowing gases from within the cell to pass through said first and second groups of vent apertures in the support disk and thence to the environment.

4. The electrochemical cell of claim 1 wherein said first and second groups of vent apertures are characterized in that the centers of the vent apertures comprising said first group are at an average perpendicular distance $R_1$ from the central longitudinal axis of the metal support disk and the centers of the vent apertures comprising said second group are at an average perpendicular distance $R_2$ from the central longitudinal axis of the metal support disk, wherein $R_2$ is less than $R_1$.

5. The electrochemical cell of claim 4 wherein the centers of the vent apertures comprising said first group lie substantially along one circumferential path of radius $R_1$ around the central longitudinal axis of said metal support disk and the vent apertures comprising said second group lie substantially along another circumferential path of radius $R_2$ around the central longitudinal axis of said metal support disk, wherein $R_2$ is less than $R_1$.

6. The electrochemical cell of claim 5 wherein $R_2$ is at least 2 mm less than $R_1$.

7. The electrochemical cell of claim 5 wherein said metal support disk has at least one convoluted surface, wherein the vent apertures comprising said first group lie on a side of said convoluted surface nearest the peripheral edge of said support disk and the vent apertures comprising said second group lie on a side of said convoluted surface nearest the center of said support disk.

8. The electrochemical cell of claim 4 wherein the cell is an AA size cylindrical cell and the total cross sectional area of said vent apertures comprising said first group is between about 6 and 12 mm² and the total cross sectional area of said vent apertures comprising said second group is between about 0.40 and 0.71 mm².

9. The electrochemical cell of claim 4 wherein the cell is a C or D size cylindrical cell and the total cross sectional area of the vent apertures comprising said first group is between about 6 and 18 mm² and the total cross sectional area of said vent apertures comprising said second group is between about 0.4 and 18.8 mm².

10. The electrochemical cell of claim 3 wherein said membrane ruptures when gas pressure within the cell reaches a pressure of less than 1000 psig (689.4×10⁴ pascal gage).

11. The electrochemical cell of claim 3 wherein the cell is an AA size cylindrical cell and said membrane ruptures when gas pressure within the cell reaches a pressure of between about 300 and 950 psig (206.8×10⁴ and 654.9×10⁴ pascal gage).

12. The electrochemical cell of claim 3 wherein the cell is an AA size cylindrical cell and said membrane ruptures when gas pressure within the cell reaches a pressure of between about 300 and 750 psig ($206.8 \times 10^4$ and $517.1 \times 10^4$ pascal gage).

13. The electrochemical cell of claim 3 wherein the cell is a C size cylindrical cell and said membrane ruptures when gas pressure within the cell reaches a pressure of between about 100 and 400 psig ($689.4 \times 10^3$ and $275.8 \times 10^4$ pascal gage).

14. The electrochemical cell of claim 3 wherein the cell is a D size cylindrical cell and said membrane ruptures when gas pressure within the cell reaches a pressure of between about 50 and 250 psig ($344.7 \times 10^3$ and $172.4 \times 10^4$ pascal gage).

15. The electrochemical cell of claim 3 wherein the cell is a AAA size cylindrical cell and said membrane ruptures when gas pressure within the cell reaches a pressure of between about 450 and 1150 psig ($310.2 \times 10^4$ and $792.8 \times 10^4$ pascal gage).

16. The electrochemical cell of claim 3 wherein said thinned portion forming said membrane is formed by the base of a groove cut into at least one of the top and bottom surfaces of said radially extending arm, when the cell is viewed in vertical orientation with the end cap assembly on top.

17. The electrochemical cell of claim 16 wherein said groove is an annular groove circumventing the cell's longitudinal axis.

18. The electrochemical cell of claim 17 wherein said annular groove is located so that the leading edge of said groove, being the edge of said groove nearest the boss, is within 2 mm from said boss surface.

19. The electrochemical cell of claim 17 wherein said insulating sealing disk has a plurality of integrally formed protrusions emanating from its top surface, when the cell is viewed in vertical position with the end cap assembly on top; said protrusions located between said rupturable membrane and the peripheral edge of said insulating sealing disk; said protrusions being capable of deflecting pieces of the rupturable membrane from entering and clogging any of said vent apertures upon rupture of said membrane.

20. The electrochemical cell of claim 19 wherein said protrusions are spaced apart along a circumferential path around the central longitudinal axis of said insulating sealing disk.

21. The electrochemical cell of claim 20 wherein said protrusions are wedge shaped having a slanted top surface, wherein the high point on said slanted surface is closer to said rupturable membrane than the low point on said slanted surface.

22. A primary electrochemical cell having an elongated housing, a positive and a negative terminal, an anode comprising zinc, a cathode comprising nickel oxyhydroxide, and an alkaline electrolyte, said housing having an elongated body with a closed end and opposing open end, and an end cap assembly sealing the open end of said housing;
the end cap assembly comprising an end cap, an insulating sealing disk underlying said end cap, and a support member being formed of a support disk of single piece metallic construction between said end cap and said insulating sealing disk, when the cell is viewed in vertical position with the end cap assembly on top, wherein said cell has a central longitudinal axis running in the direction of elongation of said housing, wherein said support disk has a first group of vent apertures and a second group of vent apertures therethrough, wherein each of said groups of vent apertures comprises at least a plurality of individual apertures, wherein the vent apertures in said first group are spaced apart from the vent apertures in said second group in the radial direction away from the cell's central longitudinal axis.

23. The electrochemical cell of claim 22, wherein the cathode comprises at least one cathode slab having an opening defined therethrough devoid of cathode material, with a portion of the outer surface of said cathode contacting the inside surface of said housing, wherein the anode is inserted within said cathode opening with separator therebetween.

24. The electrochemical cell of claim 22 further comprising an elongated current collector passing through said metal support disk and said insulating sealing disk, wherein one end of the current collector penetrates into said anode and the opposing end of said current collector is in electrical contact with said end cap.

25. The electrochemical cell of claim 22 wherein said cell housing body is cylindrical.

26. The electrochemical cell of claim 22 wherein the cell when fresh is capable of generating prolonged high power defined as at least 1.2 watt-hours when subjected to a continuous constant power output of 1 Watt.

27. The electrochemical cell of claim 22 wherein the insulating sealing disk abuts the cell housing and electrically insulates said support disk from the cell housing; said insulating sealing disk having a central boss and an integrally formed radial arm extending from said boss; wherein said radially extending arm forms a surface; said radially extending arm having a thinned portion therein forming a rupturable membrane which underlies said end cap when the cell is viewed in vertical position with the end cap assembly on top; wherein said membrane ruptures when gas pressure within the cell rises thereby allowing gases from within the cell to pass through said first and second groups of vent apertures in the support disk and thence to the environment.

28. The electrochemical cell of claim 22 wherein said first and second groups of vent apertures are characterized in that the centers of the vent apertures comprising said first group are at an average perpendicular distance $R_1$ from said central longitudinal axis and the centers of the vent apertures comprising said second group are at an average perpendicular distance $R_2$ from said central longitudinal axis, wherein $R_2$ is less than $R_1$.

29. The electrochemical cell of claim 28 wherein the centers of the vent apertures comprising said first group lie substantially along one circumferential path of radius $R_1$ around said central longitudinal axis and the vent apertures comprising said second group lie substantially along another circumferential path of radius $R_2$ around said central longitudinal axis, wherein $R_2$ is less than $R_1$.

30. The electrochemical cell of claim 29 wherein $R_2$ is at least 2 mm less than $R_1$.

31. The electrochemical cell of claim 29 wherein said metal support disk has at least one convoluted surface, wherein the vent apertures comprising said first group lie on a side of said convoluted surface nearest the peripheral edge of said support disk and the vent apertures comprising said second group lie on a side of said convoluted surface nearest the center of said support disk.

32. The electrochemical cell of claim 28 wherein the cell is a AA size cylindrical cell and the total cross sectional area of said vent apertures comprising said first group is between about 6 and 12 mm$^2$ and the total cross sectional area of said vent apertures comprising said second group is between about 0.40 and 0.71 mm$^2$.

33. The electrochemical cell of claim 28 wherein the cell is a C or D size cylindrical cell and the total cross sectional area of the vent apertures comprising said first group is between about 6 and 18 mm$^2$ and the total cross sectional area of said vent apertures comprising said second group is between about 0.4 and 18.8 mm$^2$.

34. The electrochemical cell of claim 27 wherein said membrane ruptures when gas pressure within the cell reaches a pressure of less than 1000 psig (689.4×10$^4$ pascal gage).

35. The electrochemical cell of claim 27 wherein the cell is an AA size cylindrical cell and said membrane ruptures when gas pressure within the cell reaches a pressure of between about 300 and 950 psig (206.8×10$^4$ and 654.9×10$^4$ pascal gage).

36. The electrochemical cell of claim 27 wherein the cell is an AA size cylindrical cell and said membrane ruptures when gas pressure within the cell reaches a pressure of between about 300 and 750 psig (206.8×10$^4$ and 517.1×10$^4$ pascal gage).

37. The electrochemical cell of claim 27 wherein the cell is a C size cylindrical cell and said membrane ruptures when gas pressure within the cell reaches a pressure of between about 100 and 400 psig (689.4×10$^3$ and 275.8×10$^4$ pascal gage).

38. The electrochemical cell of claim 27 wherein the cell is a D size cylindrical cell and said membrane ruptures when gas pressure within the cell reaches a pressure of between about 50 and 250 psig (344.7×10$^3$ and 172.4×10$^4$ pascal gage).

39. The electrochemical cell of claim 27 wherein the cell is a AAA size cylindrical cell and said membrane ruptures when gas pressure within the cell reaches a pressure of between about 450 and 1150 psig (310.2×10$^4$ and 792.8×10$^4$ pascal gage).

40. The electrochemical cell of claim 27 wherein said thinned portion forming said membrane is formed by the base of a groove cut into at least one of the top and bottom surfaces of said radially extending arm, when the cell is viewed in vertical orientation with the end cap assembly on top.

41. The electrochemical cell of claim 40 wherein said groove is an annular groove circumventing the cell's central longitudinal axis.

42. The electrochemical cell of claim 41 wherein said annular groove is located so that the leading edge of said groove, being the edge of said groove nearest the boss, is within 2 mm from said boss surface.

43. The electrochemical cell of claim 41 wherein said insulating sealing disk has a plurality of integrally formed protrusions emanating from its top surface, when the cell is viewed in vertical position with the end cap assembly on top; said protrusions located between said rupturable membrane and the peripheral edge of said insulating sealing disk; said protrusions being capable of deflecting pieces of the rupturable membrane from entering and clogging any of said vent apertures upon rupture of said membrane.

44. The electrochemical cell of claim 43 wherein said protrusions are spaced apart along a circumferential path around said central longitudinal axis.

45. The electrochemical cell of claim 44 wherein said protrusions are wedge shaped having a slanted top surface, wherein the high point on said slanted surface is closer to said rupturable membrane than the low point on said slanted surface.

46. A primary electrochemical cell comprising an elongated housing, a positive and a negative terminal, an anode comprising zinc, a cathode comprising nickel oxyhydroxide, and an alkaline electrolyte, said housing having an elongated body with a closed end and opposing open end, and an end cap assembly sealing the open end of said housing, said cell having a central longitudinal axis running in the direction of elongation of said housing, wherein the end cap assembly comprises an end cap, an insulating sealing disk having a rupturable membrane therein underlying said end cap, and a support member being formed of a support disk of single piece metallic construction between said end cap and said insulating sealing disk, when the cell is viewed in vertical position with the end cap assembly on top, wherein said support disk has a first group of vent apertures and a second group of vent apertures therethrough, wherein each of said groups of vent apertures comprises at least a plurality of individual apertures, wherein the vent apertures in said first group are spaced apart from the vent apertures in said second group in the radial direction away from the cell's central longitudinal axis.

47. The primary cell of claim 46 wherein said cell does not include a PTC (positive thermal coefficient) member.

48. The primary cell of claim 46 wherein said cell does not include a thermally responsive member selected from the group consisting of a PTC member, a bimetallic deflection member, and a shape memory alloy deflection member.

49. The electrochemical cell of claim 46, wherein the cathode comprises at least one cathode slab having an opening defined therethrough devoid of cathode material, with a portion of the outer surface of said cathode contacting the inside surface of said cell housing, wherein the anode is inserted within said cathode opening with separator therebetween.

50. The electrochemical cell of claim 46 further comprising an elongated current collector passing through said metal support disk and said insulating sealing disk, wherein one end of the current collector penetrates into said anode and the opposing end of said current collector is in electrical contact with said end cap.

51. The electrochemical cell of claim 46 wherein said cell housing body is cylindrical.

52. The electrochemical cell of claim 46 wherein the cell when fresh is capable of generating prolonged high power defined as at least 1.2 watt-hours when subjected to a continuous constant power output of 1 Watt.

53. The electrochemical cell of claim 46 wherein the insulating sealing disk abuts the cell housing and electrically insulates said support disk from the cell housing; said insulating sealing disk having a central boss and an integrally formed radial arm extending from said boss; wherein said radially extending arm forms a surface; said radially extending arm having a thinned portion therein forming said rupturable membrane which underlies said end cap when the cell is viewed in vertical position with the end cap assembly on top; wherein said membrane ruptures when gas pressure within the cell rises thereby allowing gases from within the cell to pass through said first and second groups of vent apertures in the support disk and thence to the environment.

54. The electrochemical cell of claim 46 wherein said first and second groups of vent apertures are characterized in that the centers of the vent apertures comprising said first group are at an average perpendicular distance $R_1$ from said central longitudinal axis and the centers of the vent apertures comprising said second group are at an average perpendicular distance $R_2$ from said central longitudinal axis, wherein $R_2$ is less than $R_1$.

55. The electrochemical cell of claim 54 wherein $R_2$ is at least 2 mm less than $R_1$.

56. The electrochemical cell of claim 54 wherein the cell is a AA size cylindrical cell and the total cross sectional area of said vent apertures comprising said first group is between about 6 and 12 mm$^2$ and the total cross sectional area of said vent apertures comprising said second group is between about 0.40 and 0.71 mm$^2$.

57. The electrochemical cell of claim 54 wherein the cell is a C or D size cylindrical cell and the total cross sectional area of the vent apertures comprising said first group is between about 6 and 18 mm² and the total cross sectional area of said vent apertures comprising said second group is between about 0.4 and 18.8 mm².

58. The electrochemical cell of claim 53 wherein said membrane ruptures when gas pressure within the cell reaches a pressure of less than 1000 psig ($689.4 \times 10^4$ pascal gage).

59. The electrochemical cell of claim 53 wherein the cell is an AA size cylindrical cell and said membrane ruptures when gas pressure within the cell reaches a pressure of between about 300 and 950 psig ($206.8 \times 10^4$ and $654.9 \times 10^4$ pascal gage).

60. The electrochemical cell of claim 53 wherein the cell is an AA size cylindrical cell and said membrane ruptures when gas pressure within the cell reaches a pressure of between about 300 and 750 psig ($206.8 \times 10^4$ and $517.1 \times 10^4$ pascal gage).

61. The electrochemical cell of claim 53 wherein the cell is a C size cylindrical cell and said membrane ruptures when gas pressure within the cell reaches a pressure of between about 100 and 400 psig ($689.4 \times 10^3$ and $275.8 \times 10^4$ pascal gage).

62. The electrochemical cell of claim 53 wherein the cell is a D size cylindrical cell and said membrane ruptures when gas pressure within the cell reaches a pressure of between about 50 and 250 psig ($344.7 \times 10^3$ and $172.4 \times 10^4$ pascal gage).

63. The electrochemical cell of claim 53 wherein the cell is a AAA size cylindrical cell and said membrane ruptures when gas pressure within the cell reaches a pressure of between about 450 and 1150 psig ($310.2 \times 10^4$ and $792.8 \times 10^4$ pascal gage).

64. The electrochemical cell of claim 53 wherein said thinned portion forming said membrane is formed by the base of a groove cut into at least one of the top and bottom surfaces of said radially extending arm, when the cell is viewed in vertical orientation with the end cap assembly on top.

65. The electrochemical cell of claim 64 wherein said groove is an annular groove circumventing the cell's central longitudinal axis.

66. The electrochemical cell of claim 65 wherein said annular groove is located so that the leading edge of said groove, being the edge of said groove nearest the boss, is within 2 mm from said boss surface.

67. The electrochemical cell of claim 65 wherein said insulating sealing disk has a plurality of integrally formed protrusions emanating from its top surface, when the cell is viewed in vertical position with the end cap assembly on top; said protrusions located between said rupturable membrane and the peripheral edge of said insulating sealing disk; said protrusions being capable of deflecting pieces of the rupturable membrane from entering and clogging any of said vent apertures upon rupture of said membrane.

* * * * *

UNITED STATES PATENT AND TRADEMARK OFFICE
CERTIFICATE OF CORRECTION

PATENT NO. : 7,579,105 B2
APPLICATION NO. : 11/062232
DATED : August 25, 2009
INVENTOR(S) : Yoppolo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1225 days.

Signed and Sealed this

Fourteenth Day of September, 2010

David J. Kappos
*Director of the United States Patent and Trademark Office*